April 2, 1940. A. J. FRANKE 2,195,483

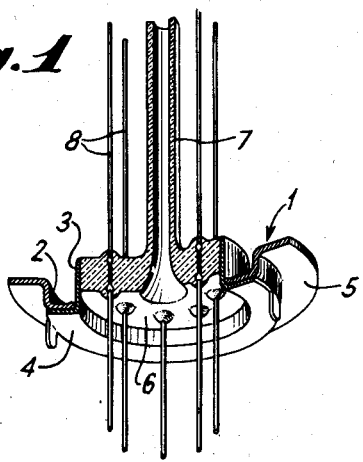
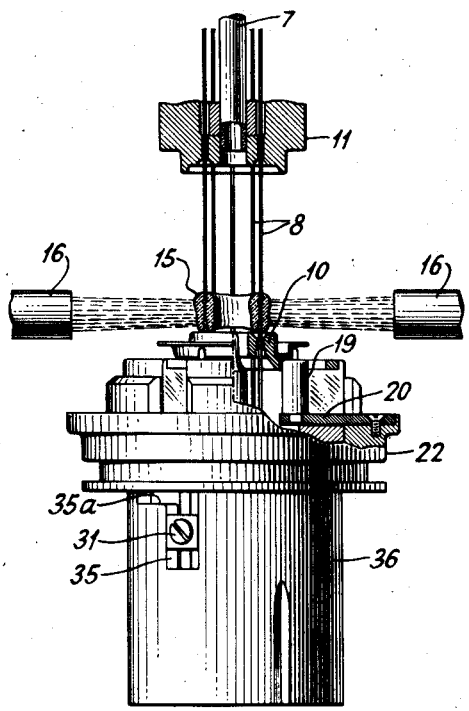
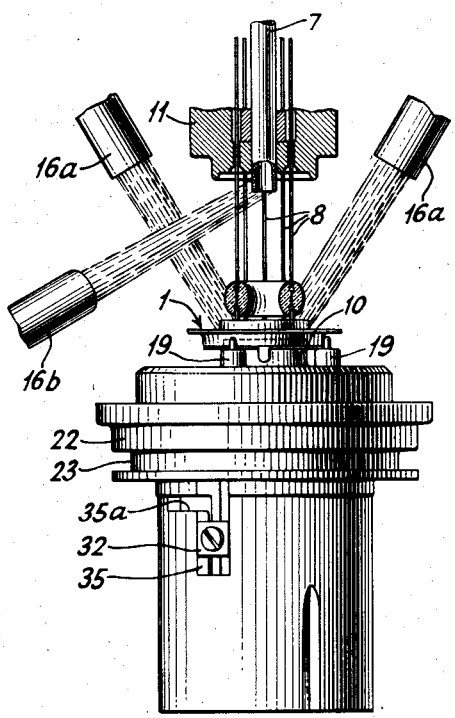

STEM MACHINE

Filed Aug. 28, 1937 3 Sheets-Sheet 2

INVENTOR.
AUGUST J. FRANKE
BY Charles McClair
ATTORNEY.

April 2, 1940.  A. J. FRANKE  2,195,483
STEM MACHINE
Filed Aug. 28, 1937  3 Sheets-Sheet 3

INVENTOR.
AUGUST J. FRANKE
BY Charles McClain
ATTORNEY.

Patented Apr. 2, 1940

2,195,483

UNITED STATES PATENT OFFICE 2,195,483

STEM MACHINE

August J. Franke, Harrison, N. J., assignor, by mesne assignments, to Radio Corporation of America, New York, N. Y., a corporation of Delaware Application August 28, 1937, Serial No. 161,392

5 Claims. (Cl. 49—2)

My invention relates to machines for making glass-to-metal seals, particularly seals between the glass and metal parts of a stem or header for metal envelopes of electron discharge devices.

Stems for metal envelopes of discharge devices such as disclosed in United States Patent 2,066,856 to Rose, dated January 5, 1937, comprise a metal ring, U shaped in cross section, into the center of which is sealed a glass disc with lead-in wires sealed gas-tight in the disc in a circle concentric with the ring, the glass for forming the disc being softened with gas flames and pressed with dies into sealing engagement with the ring and lead wires.

An object of my invention is to construct a machine for making in high speed production composite metal and glass stems of this type which will prevent oxidation of the metal parts and insure good glass-to-metal seals. To this end the machine is so constructed that the temperature of the glass and metal parts of the stem is controlled, oxidation of the metal parts is prevented, and the parts are handled automatically to insure uniform manufacture of strong gas-tight stems in high speed production.

The stem machine constructed according to my invention comprises a press mold with a lower stationary die or forming block and an upper movable die or press block. The forming block is cylindrical, and of a diameter equal to the inside diameter of the metal ring of the stem and is provided with a circular row of holes concentric with the periphery of the block to receive lead-in wires. The press block is mounted to reciprocate in a vertical line above the forming block to press the molten glass into the metal ring and into sealing engagement with the ring and the lead wires. The metal ring of the stem is placed over the upper end of the forming block to protect the inner surface of the ring from the gas flames directed on the glass and is supported upon a number of endwise movable pins spaced around the forming block to raise the inner sealing surface of the ring part way above the top of the forming block when the glass is molten, preparatory to the pressing and molding operation. The sides of the ring with the top of the forming block form a shallow cup into which the molten glass may be pressed by the press block to form a glass disc with lead wires extending therethrough and sealed gas-tight along its edge to the metal ring. To prevent stripping of the glass from the lead wires or from the metal ring, the lower ends of the lead wires are gripped by some means, such as a reciprocating chuck, which moves the lead wires upward and downward in the holes in the forming block in synchronism with the carrying pins of the block.

Features characterizing my invention are pointed out with particularity in the appended claims and one embodiment of my improved machine is described in the following specification and the accompanying drawings in which:

Figure 1 is a sectioned view of a stem made by my improved stem making machine;

Figures 3, 4, and 5 are additional views of my press mold assembly showing the different relative positions of the operative parts of the assembly during operation.

Figure 2:
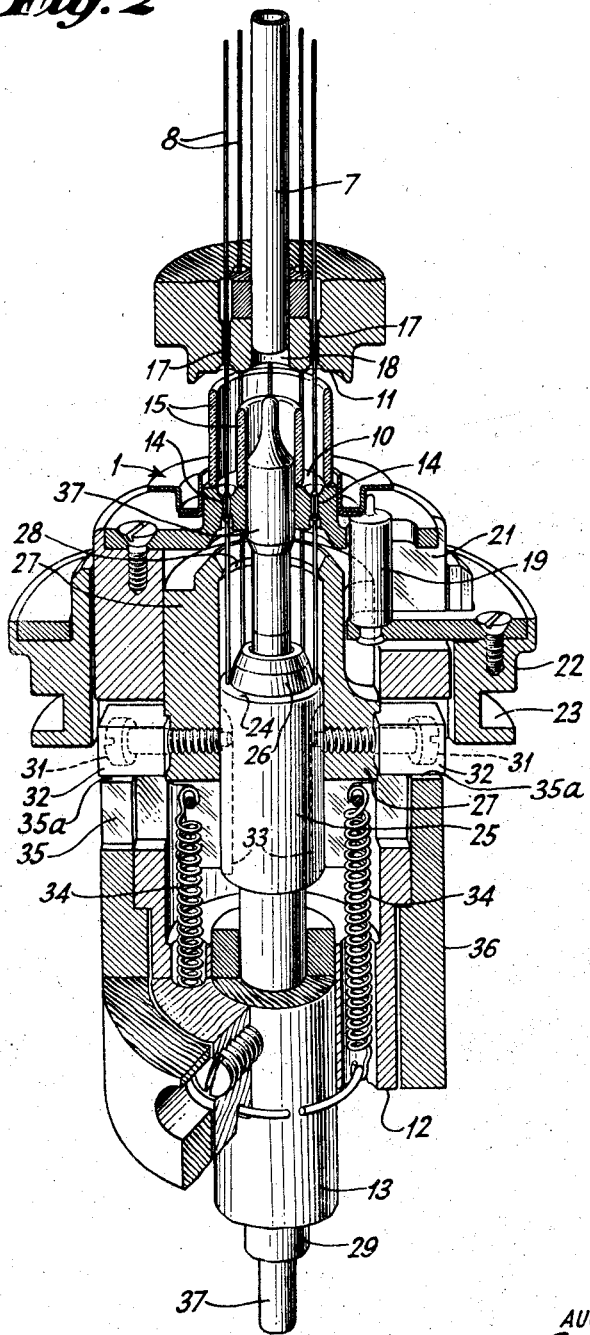
Figure 2 is a sectional perspective view of a press mold assembly constructed according to my invention.

The stem made by my improved machine and as shown in inverted position in Figure 1 comprises a metal ring 1 U shaped in cross section with two cylindrical portions or annuli 2 and 3 joined by a transverse section 4. The ring, which may conveniently be rolled or stamped from sheet metal, has an outwardly extending flange 5 that may be welded to a corresponding flange of a metal envelope. The opening or hole of the inner cylinder 3, selected of a metal that will weld to glass, is closed by a flat vitreous press or disc 6, preferably of glass, joined gas-tight to the inner cylinder by welding the glass disc along its edge at high temperature to the metal of the cylinder. The disc is provided with exhaust tube 7 extending perpendicularly from the center of the disc and lead-in wires 8 extend through and hermetically seal in the disc along a circle concentric with the periphery of the disc. The lead-in wires may be of the kind commonly used for radio tubes and lamps, such as conductors with central sections of dumet or an alloy proportioned to have a coefficient of thermal expansion matching the glass.

The particular press mold for making the stem of Figure 1 and shown in the drawings for the purpose of illustrating the characteristic features of my invention comprises a lower mold assembly including a forming block 10 and an upper mold assembly including a press block 11 journalled one above the other and rotated at the same speed. The parts of the lower mold assembly including the forming block 10 are carried upon a cylindrical housing 12 which in turn is attached by a set screw to the upper end of shaft 13 driven to rotate the entire assembly in synchronism with the upper press block.

To protect the inner surface of the ring from the oxidizing effect of flames used in making the stem, the forming block 10 is made cylindrical and of such a diameter that the inner cylindrical portion 3 of metal ring 1 may be slip-fitted over the block, and of a height equal to the width of the ring. Through the forming block are a series of holes 14 slightly larger than the lead wires arranged in a circle concentric with the periphery of the block to receive lead-in wires 8. Material for making the glass disc of the stem is provided in the form of two concentric glass cylinders 15 of measured mass placed respectively inside and outside the circle of lead-in wires. Heat for softening the glass is supplied by gas flames directed onto the glass from jets 16 as shown in Figure 3. Press block 11 is mounted to reciprocate vertically above the forming block, and has holes 17 in alignment with lead wire holes 14 in the forming block and has a central opening 18 to receive glass exhaust tube 7 bearing at its upper end against push rod 7a and slidably held by springs 7b. The lower end of the central opening 18 of the press block is flared and the lead-in wire holes 14 and 17 are countersunk to provide conical recesses which serve to mold raised glass pips around the lead-in wires and a fillet around the exhaust tube for strengthening their junction with the finished glass disc.

To vertically raise the metal ring, just before the glass is to be pressed and molded, and to bring the inner surface of the ring 1 part way above the upper end of the forming block and receive the glass when it is pressed, movable pins 19, preferably three in number, are uniformly spaced around the periphery of the block and under the ring. The pins are provided at their upper end with short extensions to center the ring over the forming block and are carried at their lower ends upon radial fingers 20 extending through vertical slots 21 in cylindrical housing 12, the fingers in turn being attached to collar 22 vertically slidable on the outer surface of cylindrical housing. A pivoted yoke 23a engages the annular groove 23 on the collar at one end and engages a cam surface at the other end to raise and lower the collar with its pins during operation of the machine.

According to a further feature of my invention a chuck is provided for gripping and positively raising and lowering the lead wires in the mold during operation to insure movement of the several lead wires in unison with the movement of the ring and prevent stripping of the glass. The lead wires when inserted through holes 14 in the forming block come to rest with their lower ends upon a shoulder 24 at the upper end of an inner chuck clamp 25. The inner chuck clamp is also provided at its upper end with a conical tapered portion 26 and is slidably mounted in outer chuck clamp 27 which has at its upper end an inverted conical taper 28 complementary to the conical taper 26 of the inner clamp member. The difference in the diameters of the conical surfaces 26 and 28 is sufficient to accommodate the ends of the lead wires 8 and to wedge the ends of the lead wires between the two conical surfaces when the inner chuck clamp 25, carrying the ends of the wires on shoulder 24, moves upwardly in the outer chuck clamp 27. The relative diameters of the two conical surfaces 26 and 28 accordingly are determined by the size of the lead wires to be gripped. If the lead wires are relatively small, for example, the smaller diameter of conical surface 28 may slightly overlie conical surface 26. The ends of lead wires inserted through openings 14 are guided past the inner rim of the outer chuck clamp, against the conical tapered end of the inner chuck clamp and hence to the shoulder 24 on the inner clamp. Inner chuck clamp 25 is positively reciprocated during operation by shaft 29 and cam driving mechanism 30 located below the assembly. Two fillister head pilot screws 31 fasten two square lock blocks 32 to the outer clamp and slidably engage at their ends longitudinal grooves 33 in opposite sides of the inner chuck clamp. The outer chuck clamp is biased downwardly by springs 34 which extend through longitudinal holes in the housing 12 and are hooked at their lower ends to a ring lying in an annular groove in registry with said openings in the bottom of the housing. The outer chuck clamp may be locked in the upper or loading position shown in Figure 2 by the stepped slots 35, with steps 35a, in the upper edge of a lock collar 36 journalled on the outer surface of the cylindrical housing.

To prevent closure of the exhaust tube passage while it is being molded integral with the glass disc, there is provided plunger 37 extending through the center of the chuck clamps and slidable endwise therein by cam driving mechanism 38, the upper end of the plunger being tapered to enter the lower end of the exhaust tube.

The chuck clamps 25, 27, the metal ring raising pins 19, and the upper press block 11 successively assume in operation the positions shown in Figures 2, 3, 4 and 5. To load my machine with the metal and glass parts necessary for manufacturing a radio tube stem, the press block is retracted to an upper position several inches above the forming block, pins 19 are slightly raised and the upper end of the plunger 37 is raised well above the forming block, as shown in Figure 2. The metal ring is slipped over the forming block and brought to bear upon the upper ends of pins 19, which hold the upper rim of the metal ring slightly above the plane of the forming block and roughly center glass outer tube 15 dropped upon the block. The inner glass tube 15 slides into a central position over the end of the plunger. A glass exhaust tube is inserted its full length in the press block, its end bearing against the end of push rod 7a and its sides being gripped by springs 7b. The lead-in wires 8 are then threaded downwardly through the openings 17 in the press block, between the two glass cylinders, through the openings 14 in the forming block, past the inner edge 28 of the outer chuck clamp, and against the shoulder 24 on the inner chuck clamp. Lock collar 36 with its stepped slots 35a is rotated with respect to the cylindrical housing to bring lock blocks 32 into alignment with the vertical portion of the slots 35 in the collar and the springs draw the outer chuck clamp downwardly with a snap firmly gripping the lower ends of the lead wires between the two tapered portions 26 and 28 of the inner and outer chuck clamps. Pins 19 then lower the metal ring to the position shown in Figure 3 with the upper edge of the ring flush with the top of the forming block, the plunger is retracted to a position below the forming block, and fires from gas jets 16 are played upon the glass cylinders. As the glass cylinders soften, they flow together and around the lead-in wires and form a plastic annular mass of glass adherent to the wires. The chuck clamps may then be raised by cam mechanism 38, pushing upwardly the lead wires and their adherent mass of glass to remove the glass from the relatively cool forming block. The pins 19 are then raised, as shown in Figure 4, to expose the inner cylinder of the metal ring to gas jets 16a projected down on to the ring, and the exhaust tube is slightly lowered to expose its end to a flame from jet 16b to soften the glass.

Figure 5:
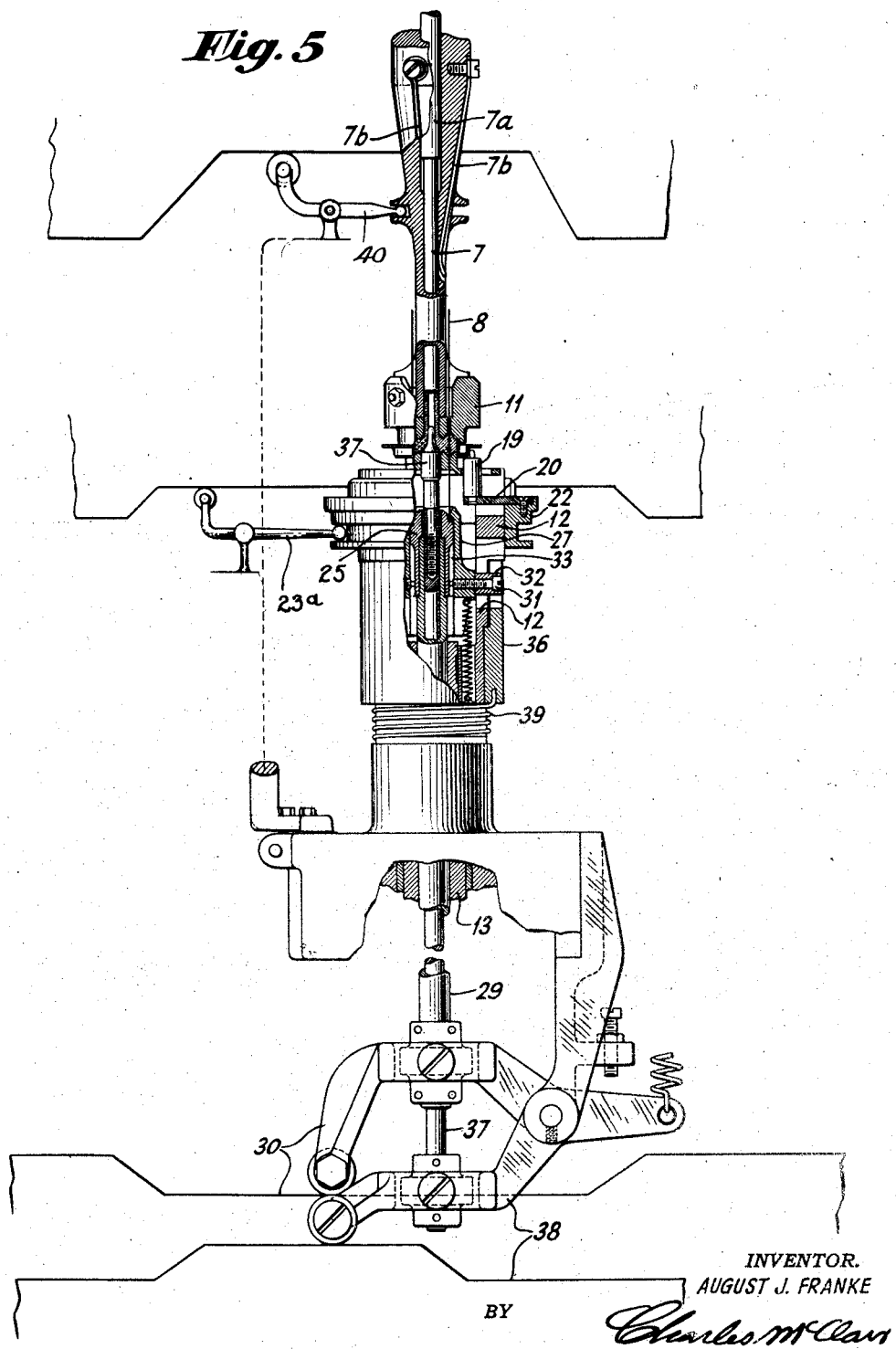

Finally the plunger is raised and the press block is lowered to press and form the molten glass between the faces of the press block, the forming block and the inner surface of the metal ring, as shown in Figure 5, the molten glass being forced into welding engagement with the inner wall of the ring, the end of the exhaust tube and the lead-in conductors. To prevent too rapid cooling of the glass and insure its proper annealing in this finally molded shape the press block is withdrawn, plunger 37 is lowered and the stem assembly is raised a short distance above the forming block by the ring carrying pins 19 and the lead wire carrying chuck 25—27, the pins being moved upwardly in unison to prevent either the lead wires or the ring from stripping from the glass. If desired, low temperature flames may be played on the parts of the stem, followed by again lowering the stem to the forming block and pressing with the press block. To remove the finished stem, after cooling, the press block is retracted and the chuck assembly is raised until the lock blocks 32 are brought to a level with the step in the slot 35 of lock collar 36, whereupon the collar is rotated by spring 39 to bring the step under the lock blocks and hold the outer chuck clamp in a raised position. Now by lowering the inner chuck clamp, the ends of the lead wires are released and the header assembly may be removed.

It has been found convenient to mount a number of the press mold assemblies on the periphery of a rotatable table and to rotate the table step-by-step to bring the press mold with the glass and metal parts of the stem successively into registry with different gas flames. Cam rollers riding on stationary cam tracks may conveniently be employed to move the different parts of the press mold assemblies in the proper sequence. A pinion, not shown, may be placed on the lower end of shaft 13 and engaged with a rack to continuously rotate the lower mold assembly, the upper mold assembly being similarly driven with a rack and pinion. As the table revolves, cam rollers of the yoke 23a and of the driving mechanisms 30 and 38 raise and lower as they move along the pre-formed surface of the cam tracks, to move pins 19 and drive plunger 37 and chuck members 25 and 27 in cooperative relation with the upward and downward movement of the upper press block and its push rod 7a. And to vertically reciprocate the upper mold assembly in unison with the movement of the chuck assembly 25—27, plunger 37 and pins 19, a pivoted arm 40 may be carried by the table, with one end slidably engaged in a groove about the shaft of the press block and with the other end riding through a roller on the surface of a stationary cam. Spring 39 biases the lock collar 36 so that when the lock blocks 32 are level with the step 35a the step slips under the lock block, and a hook operated from the table engages a groove in the skirt of the lock collar to rotate it in the opposite direction to bring the slot 35 into alignment with the lock block.

The machine, constructed according to my invention, is capable of making composite metal and glass stems for electron discharge devices. My novel machine is so constructed that the temperature of the glass and metal parts of the stem are controlled, oxidation of the metal parts is prevented, and the parts are handled automatically to insure uniform manufacture of strong, gas-tight stems in high speed production. While one embodiment of my improved machine has been specifically described, it will be obvious to those skilled in the art that many modifications may be made in structural details of the machine and in its mode of operation without departing from the scope of the invention.

I claim:

1. A machine for making a stem comprising a press mold with a cylindrical forming block and a press block, the two blocks being relatively movable, a plurality of holes through the forming block and a plurality of holes through the press block, the holes in said press block being in registry with the holes in the forming block, pins spaced around the periphery of the forming block and movable normal to the molding face of the forming block, a chuck member having two relatively movable clamps, the clamping surfaces of said clamps being in alignment with said holes, a central opening in said press block, a central opening in said forming block in registry with the opening in the press block, and a plunger with a rounded end slidable in the forming block opening.

2. A stem forming machine including a forming block having a cylindrical raised portion for receiving a metal ring, holes near the periphery of and extending through said raised portion, a plurality of pins in the forming block spaced around said raised portion and movable for sliding said ring upward on said cylindrical raised portion and a central opening through said raised portion, a plunger with a rounded end slidable in said opening, a press block having holes in registry with the holes in said raised portion, means for heating and softening a mass of vitreous material between the blocks, said raised portion and press block being relatively movable to compress the softened material into a flat disc, said press block having a central opening to receive a vitreous exhaust tube said opening being in registry with said plunger, means for moving said pins in cooperative relation with the movement of said blocks other means for locally heating the end of the exhaust tube to weld said end to the disc around the rounded end of the plunger when the press block is moved toward the forming block.

3. A machine for making a stem with a metal ring into the center of which is sealed a vitreous disc with lead wires sealed gas-tight in the disc, comprising a cylindrical forming block of a diameter equal to the inside diameter of the metal ring, a plurality of holes through the forming block to receive said lead wires, a press block reciprocatably mounted above said forming block to form the vitreous disc and press the periphery of the disc into sealing engagement with the inner surface of said ring, holes in said press block in registry with the holes in the forming block, means for gripping the ends of said lead wires and means for reciprocating the gripping means and moving the lead wires through the holes in the blocks in cooperative relation with the movement of said press block.

4. A stem machine for sealing a glass disc along its periphery to the inner surface of a metal cylinder comprising a cylindrical forming block of a diameter to receive said cylinder, a press block movable above said forming block to press a molten glass disc into sealing-in engagement along its periphery with the metal cylinder, and means for raising said cylinder upward on the forming block in cooperative relation with the movement of said press block.

5. A machine for making a stem with a vitreous disc and lead wires sealed through the disc and welded along its periphery to a metal cylinder, comprising a two part press mold for forming said disc and pressing its periphery while molten into sealing engagement with the inner surface of said cylinder, registering holes in the two parts of the mold for receiving said lead wires, and means for gripping the ends of the lead wires comprising two round chuck clamps with registering annular clamping surfaces in alignment with said holes.

AUGUST J. FRANKE.